United States Patent [19]
Jacobi

[11] Patent Number: 5,098,201
[45] Date of Patent: Mar. 24, 1992

[54] SEALABLE VALVED BAG

[75] Inventor: Stephen V. Jacobi, Ballwin, Mo.

[73] Assignee: Monsanto Company, St. Louis, Mo.

[21] Appl. No.: 828,931

[22] Filed: Feb. 12, 1986

[51] Int. Cl.⁵ .............................................. B65D 30/24
[52] U.S. Cl. ...................................... 383/48; 383/54
[58] Field of Search ................................... 383/48, 54

[56] References Cited

U.S. PATENT DOCUMENTS

| | | | |
|---|---|---|---|
| 2,437,693 | 3/1948 | Hartman | 383/48 |
| 2,977,038 | 3/1961 | LaFave | 383/54 |
| 3,000,550 | 9/1961 | Charlton | 383/48 |
| 3,143,936 | 8/1964 | Becker | 383/54 |
| 3,146,564 | 9/1964 | Hopkin | 53/139 |
| 3,191,850 | 6/1965 | Niemeyer | 383/54 |
| 3,203,623 | 8/1965 | Hartig | 383/48 |
| 3,216,647 | 11/1965 | Arnold | 383/54 |
| 3,261,267 | 7/1966 | Becker | 383/54 |
| 3,633,692 | 1/1972 | Lau | 177/114 |
| 3,738,892 | 6/1973 | Curcio | 156/379.7 |
| 3,831,643 | 8/1974 | Lau | 141/68 |
| 3,964,650 | 5/1976 | Lau | 222/450 |
| 3,973,719 | 8/1976 | Johnson et al. | 220/359 |
| 4,003,188 | 1/1977 | Lau | 53/126 |
| 4,044,941 | 8/1977 | Knudsen | 383/43 |
| 4,049,191 | 9/1977 | Stearley | 229/62.5 |
| 4,066,108 | 1/1978 | Lau | 141/68 |
| 4,095,736 | 6/1978 | Rothschild et al. | 229/62.5 |
| 4,111,354 | 9/1978 | Brunker | 229/62.5 |
| 4,367,620 | 1/1983 | Fox | 53/479 |
| 4,394,207 | 7/1983 | Berthelsen et al. | 156/578 |

FOREIGN PATENT DOCUMENTS

| | | | |
|---|---|---|---|
| 997431 | 7/1965 | United Kingdom | 383/48 |
| 1150918 | 5/1969 | United Kingdom . | |
| 132487 | 7/1973 | United Kingdom . | |
| 1325904 | 8/1973 | United Kingdom . | |
| 1327280 | 8/1973 | United Kingdom . | |
| 1432399 | 4/1976 | United Kingdom . | |

Primary Examiner—Stephen Garbe
Attorney, Agent, or Firm—R. C. Loyer

[57] ABSTRACT

A bag having a filling valve integral with and extending through an end closure section of the bag adapted to be sealed by electromagnetic field induction heating. Valves having a thermoplastic polymeric inner layer are provided with metal foil adjacent to at least a part of the layer as means for inductively heating the polymeric inner layer. The thermoplastic polymeric inner layer can comprise polyolefins and the metal foil can comprise aluminum. Methods of sealing a bag having such a filling valve are provided.

1 Claim, 2 Drawing Sheets

SEALABLE VALVED BAG

BACKGROUND OF THE INVENTION

The invention of this application relates to valved bags, such as are used for packaging bulk particulate material. Such bags have a valve in a collapsible tubular form generally located in an end closure of the bag. More particularly this invention relates to a sealable valve and to sealing of such valves.

Many particulate materials, such as powders or granules of cement, flour, seeds, grains, chemicals and the like are packaged and transported in sealed bags, for instance multi-walled paper bags. To facilitate filling, such bags have long been provided with valves, for instance in a collapsible tubular form in an end closure. In a convenient method for filling such bags with bulk particulate material, a nozzle is inserted through the valve to allow the particulate material to flow into the bag.

Although the valve may tend to collapse to some degree upon withdrawal of the nozzle, many efforts have been made to provide a more secure closure of the valve to preclude subsequent communication through the bag valve which may result, for instance, in the loss of material from the bag or the introduction of foreign material such as insects or other contaminants into the bag. Secure closures have been obtained, for instance, by providing extending sleeves on the valve which can be folded to seal the valve. Such folded sleeves often exhibit the undesirable characteristic of becoming unfolded, e.g. accidentally or otherwise, resulting in possible transfer of material through the valve.

Alternatively, such externally extending sleeves have been taped or glued generally at considerable expense of time and labor. In still other cases valves have been provided with wire springs to securely fold an internally extending sleeve as disclosed for instance in U.S. Pat. No. 4,111,354. Such wire spring seals do not assure that material cannot be transferred through the valve.

In still other cases, valves have been sealed by applying an adhesive to the interior peripheral surfaces of the valve, for instance after filling of the bag as disclosed in U.S. Pat. No. 4,394,207. Such adhesive application is not carried out without some risk of product contamination with the applied adhesive. Contamination is reduced by the use of releasable glue spots within a valve, for instance comprising a polyethylene liner, as is disclosed in U.S. Pat. No. 4,049,191. Such releasable sealing, however, allows a sealed valve to be repeatedly broken and resealed.

The use of polymeric valve liners allows further opportunity for valve sealing, for instance by heating to fuse the polymeric liner. See for instance, U.S. Pat. Nos. 3,831,643, 4,003,188, and 4,006,108 which disclose the use of a pair of heated jaws for engaging a valve sleeve internally coated with a heat sensitive adhesive material. The crimped and heat sealed valve sleeve is then stuffed into a pocket on the side of the valve. See also U.S. Pat. No. 4,367,620 where a polymeric valve liner is sealed by conductive heating through the end closure of the bag to cause fusion of a polymeric valve liner which is held in a collapse state by the application of vacuum through porous windows in the polymeric liner. Such methods are not without their disadvantages, for instance, slow heating and the possibility of thermal degradation of the bag.

An object of this invention is to provide a sealable valve for protecting the integrity of materials stored in bags, such as multi-walled bags.

Another object of this invention is to provide a bag with a valve that can be sealed rapidly without significantly adversely affecting the bag material, for instance by the application of excess heat.

Still another object of this invention is to provide a method of rapidly sealing a valve in a bag for storage of bulk particulate material.

A further object of this invention is to provide a seal in a bag valve that cannot be readily unfastened without destroying the valve or the bag, thereby providing a greater degree of assurance that there has been no loss of material from the bag or introduction of foreign material into the bag.

These and other objects of the invention will be more readily apparent from the following detailed description.

SUMMARY OF THE INVENTION

This invention provides a bag having a sealable filling valve which is integral with and extends through a wall such as an end closure section of the bag layer and means for inductively heating said polymeric inner layer. Such valves are adapted to be formed into a tubular shape to facilitate filling and are also readily collapsible, for instance, to form two, substantially contacting, opposing sections to facilitate sealing by induction heating from an electromagnetic field so that such opposing sections of the thermoplastic polymeric layer can fuse upon cooling.

This invention also provides methods of sealing a bag having such valves, for instance, by passing a collapsed valve in proximity of an electromagnetic field induction heating source to heat the polymeric layer, whereby opposing sections of the valve are fused upon cooling.

DETAILED DESCRIPTION OF THE INVENTION

Figure 1:
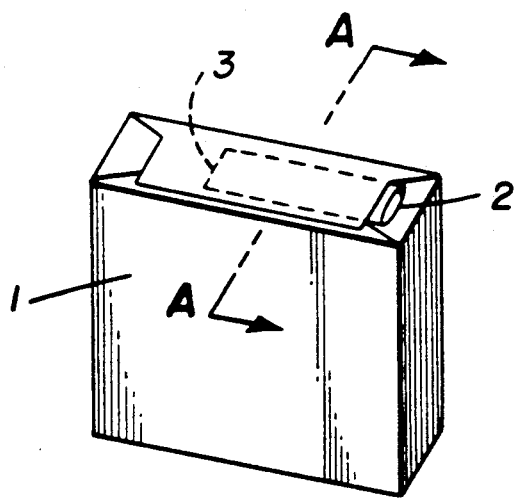
FIG. 1 is a perspective illustration of a bag according to this invention having a valve in an end closure segment thereof.

FIG. 1 illustrates bag 1 according to this invention where valve 2 is located, as indicated by dotted line 3, in an end closure of the bag. The valve can be of a length such that it does not extend substantially outside of said end closure; or the valve may extend with a sleeve substantially beyond the end closure. In many cases it is desirable that the bag be of multi-wall construction. Such bags can be fabricated from a variety of materials such as paper or polymeric material. In many instances it is desirable that the walls of the bag be air permeable to facilitate filling of the bag.

Figure 2:
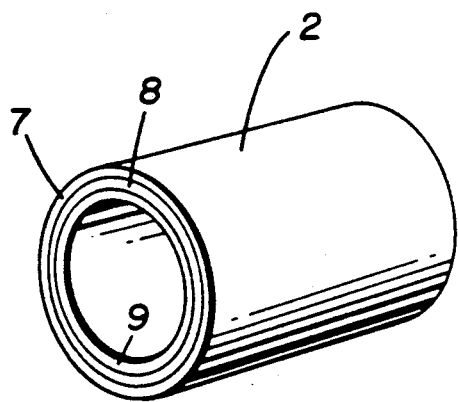
FIG. 2 is a schematic illustration of a valve useful in a bag of this invention.
Figure 6:
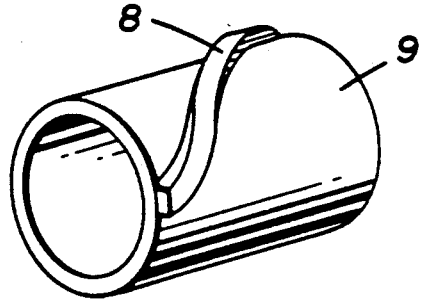
Figure 3:
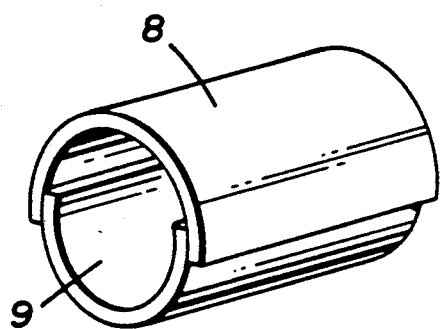
Figure 7:
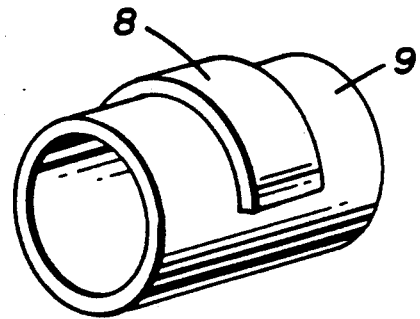

FIG. 2 illustrates one embodiment of a valve useful in the bag of this invention. The valve is illustrated in an open tubular form as used in bag filling operations. Valve 2 is a tubular laminate with outer layer 7 comprising Kraft paper; intermediate layer 8 comprising a metal foil provides means to inductively heat inner layer 9 comprising a thermoplastic polymer. A great many variations of the valve illustrated in FIG. 2 are useful in embodiments of bags according to this invention. For instance outer layer 7 can comprise a single or multiple layers of a variety of materials, such as paper or polymeric films. Outer layer 7 can circumscribe the entire periphery of the valve, part of periphery or, optionally, be omitted.

To provide the means to inductively heat the thermoplastic polymeric inner layer, intermediate layer 8 can comprise a great variety of metal foils of varying thickness. Aluminum foil is generally preferred because of its low cost and ductility. Such means for inductively heating is adjacent to at least a part of inner layer 9 which can comprise a variety of thermoplastic polymeric materials such as polyolefins which are often preferred because of their availability and low cost. A convenient polyolefin material is polyethylene.

In some embodiments, e.g. when the valve extends with a sleeve beyond the end closure, inner layer 9 may be of a shorter length than the entire valve, and be located, for instance, substantially in said sleeve. In many other embodiments, inner layer 9 will extend over the entire length of the valve.

Alternative embodiments of the intermediate and inner layers of the valve are illustrated perspectively in FIGS. 3, 4, 5, 6 and 7 which show that the internal peripheral segment of the valve can comprise thermoplastic polymeric layer 9, metal foil 8, or a combination thereof. In the embodiment shown in FIG. 3, the internal peripheral segment of the valve comprises adjacent layers of thermoplastic polymer 9 and metal foil 8. In many cases it may be preferred that the inner surface of said foil have laminated thereto a film of thermoplastic polymeric material. In the embodiment shown in FIGS. 4, 5, 6 and 7, the thermoplastic polymeric inner layer 9 extends over a substantially major portion, e.g. the entirety, of the internal periphery of the valve, and the metal foil 8 is in various locations around the external periphery of layer 9, extending in some cases at least a major portion of the length of said valve.

Figure 4:
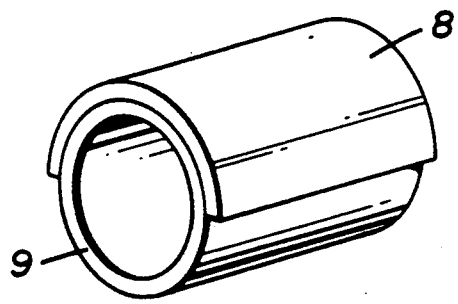
FIGS. 3, 4, 5, 6 and 7 are perspective illustrations of the internal peripheral segments of a valve, comprising thermoplastic polymeric material and metal foil, useful in embodiments of this invention.
Figure 5:
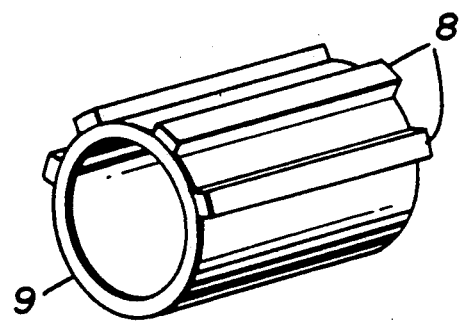

With reference to FIG. 4, in a preferred embodiment the valve comprises an inner layer 9 of polyethylene, e.g. having a basis weight of 75 g/m$^2$. Layer 8 extending about one-half of the periphery of inner layer 9 is an aluminum foil/Kraft paper laminate comprising aluminum foil, e.g. having a thickness of about 0.013 mm coated on both sides with a thin layer of adhesive. The external layer of the laminate comprises Kraft paper, e.g. having a basis weight of 250 g/m$^2$, to facilitate gluing the aluminum foil laminate portion of the valve to the end segment of the bag.

In many embodiments it is also desirable that a portion, e.g. a substantial portion of the length of the valve extending within the bag be provided with one or more slits, for instance to facilitate filling as well as valve collapse.

Figure 8:
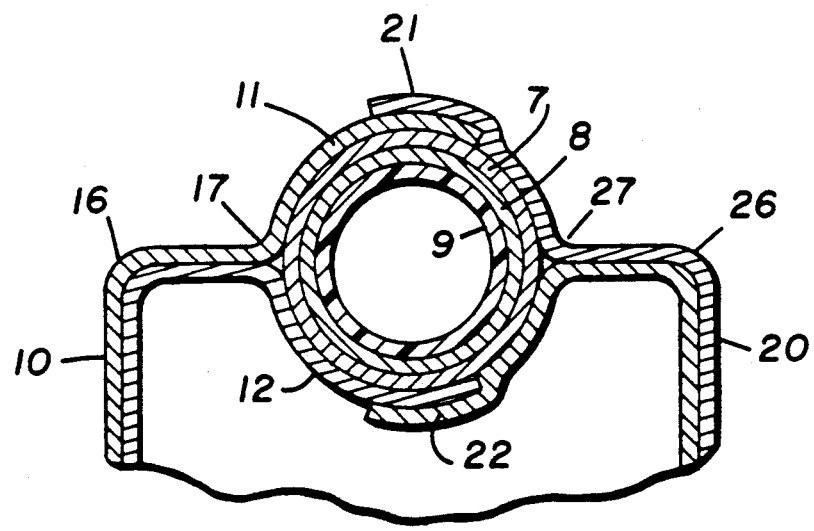
FIGS. 8 and 9 are schematic illustrations of a cross-sectional view of an end segment of a bag having a valve according to this invention with FIG. 8 illustrating the valve in a tubular form and FIG. 9 illustrating the valve in a collapsed form.

With reference to FIG. 8, there is illustrated a cross-sectional view (along cutting plane A—A of FIG. 1) of an end closure wall of a bag having a valve extending through the wall of the bag between inner and outer wall layers. In the cross-sectional representation of FIG. 8 a multi-layered bag wall 10 bends at point 16 to form part of an end closure wall, separating at point 17 into outer wall layer 11 and lower layer 12 which extend around a valve comprising a tubular lamination of outer paper layer 7, metal foil layer 8 and inner thermoplastic polymeric layer 9. The end closure is completed by the extension of multi-layered wall 20 which bends at point 26 to form the other part of end closure wall, separating at point 27 into outer layer 21 and inner wall layer 22. The interface of the various layers 7, 11, 12, 21 and 22 are, conveniently adhesively bonded to secure the valve substantially in plane of the end closure wall of the bag.

In this regard the valve is divided into two hemicylindrical sections between separating points 17 and 27. The exterior layers of the valve in each of the two hemicyclindrical sections are adhesively bonded to the respectively contiguous outer and inner wall layers of the bag.

Desirably such valves are adapted to be collapsed such that the hemicyclindrical sections to form two, corresponding substantially contacting, opposing sections; in such cases the foil will preferably traverse at least a portion, more preferably a major portion, of one of the opposing sections.

Figure 9:
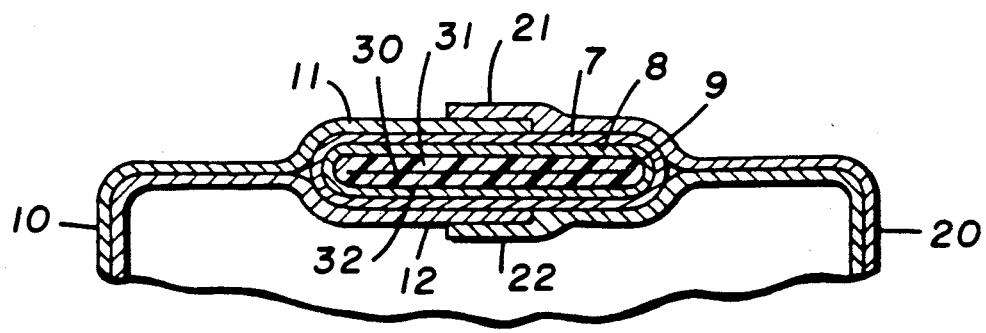

FIG. 9 is a cross-sectional illustration similar to that of FIG. 8 except that the tubular valve is collapsed such that the thermoplastic polymeric layer 9 formed into an outer opposing section 31 and a inner opposing section 32 which contact at interface 30. With the application of an electromagnetic field the metal foil of layer 8 will rise in temperature. The intensity and duration of the electromagnetic field is desirably at a level such that the temperature of the metal will rise above the melting temperature of a thermoplastic polymeric material causing a fusion at interface 30 upon cooling of the thermoplastic material.

This invention further provides a method of sealing a bag having a filling valve such as described herein. In this method a valve having a thermoplastic polymeric inner layer and metal foil adjacent to at least a part of said layer is collapsed to form two, substantially flat, opposing sections. Such collapsed valve is then passed in proximity of an electromagnetic field induction heating source of sufficient power such that said foil is heated by induction, e.g. to about the melting temperature of said polymeric inner layer. The heated foil can heat the polymeric inner layer, whereby contacting, opposing sections of the valve are fused upon cooling of the thermoplastic polymeric material.

In practice such bags can be filled by inserting a filling nozzle into the valve, for instance, in an end closure of which has been expanded into tubular form. When the bag is sufficiently filled, the nozzle is removed from the valve. Due to stress on the end closure, provided in part by the particulate fill in the bag, the valve will generally tend to collapse to form two, substantially flat, opposing sections. In some cases it may be desirable depending on the efficiency of operation of the filling machine to remove particulate material from within the valve to preclude separation of the polymeric surfaces with granules which may be adverse to adequate sealing. Such particulate removal can be effected for instance by applying a vacuum nozzle within the valve or by rotating the bag to cause particulate to fall into the bag. A particularly advantageous method of ensuring that the opposing sections of the thermoplastic layer of a collapsed valve are in intimate contact during the heating and cooling of the sealing step is to position the bag such that the end closure section having the valve is the lowermost part of the bag whereby the weight of the particulate material will assist in maintaining the valve in a collapsed form by providing force from inside the bag against the wall containing the valve.

Figure 10:
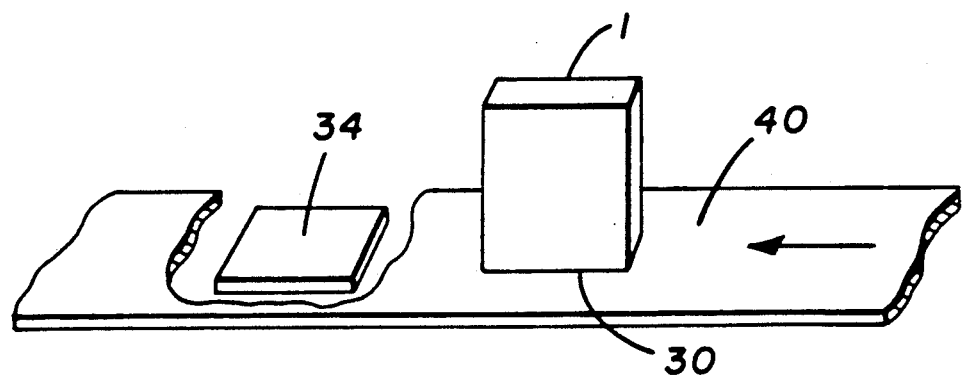
FIG. 10 is a schematic illustration of apparatus useful in the method of sealing bag valves according to this invention.

With reference to FIG. 10, bag 1 is positioned such that the end closure 30 containing the valve is in a lowermost position. Such bag is shown on a non-metallic conveyor belt 40. As indicated in the cutaway section of the conveyor belt, an electromagnetic field generator 34 is positioned under the belt. When the valve passes in proximity of the electromagnetic field generator heat is induced in the metal foil. The strength of the electromagnetic field and/or the speed of the belt can be readily adjusted to provide adequate heating of the metal foil such that its temperature will rise above the melting temperature of the thermoplastic polymeric material being maintained in a collapsed form such that sealing of the valve will occur.

While the invention has been described herein with regard to certain specific embodiments, it is not so limited. It is to be understood that variations and modifications thereof may be made by those skilled in the art without departing from the spirit and scope of the invention.

What is claimed is:

1. A bag having a collapsible filling valve formed from a tubular laminate comprising a first hemicylindrical section and an opposing hemicylindrical section, wherein said first section comprises a metal foil layer and said opposing section comprises a thermoplastic inner layer and no metal foil layer; wherein, when said valve is collapsed, said sections are collapsed into flat opposing sections; wherein said collapsed valve lies substantially in the plane of one wall of said bag between an inner wall layer and an outer wall layer; and wherein said metal foil comprises means for inductively heating a thermoplastic inner layer.

* * * * *